(12) United States Patent
Numata et al.

(10) Patent No.: US 11,294,606 B2
(45) Date of Patent: Apr. 5, 2022

(54) PRINT SYSTEM INCLUDING A LEARNED MODEL TO SELECT A PRINTER

(71) Applicant: CANON KABUSHIKI KAISHA, Tokyo (JP)

(72) Inventors: Yasuhiro Numata, Kanagawa (JP); Hirofumi Okuhara, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/092,383

(22) Filed: Nov. 9, 2020

(65) Prior Publication Data

US 2021/0149605 A1    May 20, 2021

(30) Foreign Application Priority Data

Nov. 20, 2019 (JP) .............................. JP2019-209832

(51) Int. Cl.
*G06F 3/12* (2006.01)
*G06N 20/00* (2019.01)
*G06N 3/08* (2006.01)

(52) U.S. Cl.
CPC .......... *G06F 3/1204* (2013.01); *G06F 3/1236* (2013.01); *G06F 3/1287* (2013.01); *G06N 3/08* (2013.01); *G06N 20/00* (2019.01)

(58) Field of Classification Search
None
See application file for complete search history.

(56) References Cited

U.S. PATENT DOCUMENTS

| 2009/0157579 A1* | 6/2009 | Rai ......................... G06N 3/02 706/21 |
| 2020/0192609 A1* | 6/2020 | Shinkai ................. G06F 3/1273 |
| 2020/0393998 A1* | 12/2020 | Su ............................ G06N 3/08 |
| 2021/0192598 A1* | 6/2021 | Yoshida ............... G06Q 30/016 |
| 2021/0279841 A1* | 9/2021 | Liu ....................... G06T 3/4046 |

FOREIGN PATENT DOCUMENTS

JP      11-053142 A      2/1999

* cited by examiner

*Primary Examiner* — Dov Popovici
(74) *Attorney, Agent, or Firm* — Venable LLP

(57) ABSTRACT

A printer system connects a plurality of printers and a terminal via a network. First, the system inputs data for a new print from the terminal. Next, based on the inputted data, the system uses a learned model that has learned to select one printer among the plurality of printers based on data that was used in previous printing by the plurality of printers, to infer a printer suited to the new print from the plurality of printers. As a result of the inference, the system conveys the obtained printer to the terminal.

18 Claims, 6 Drawing Sheets

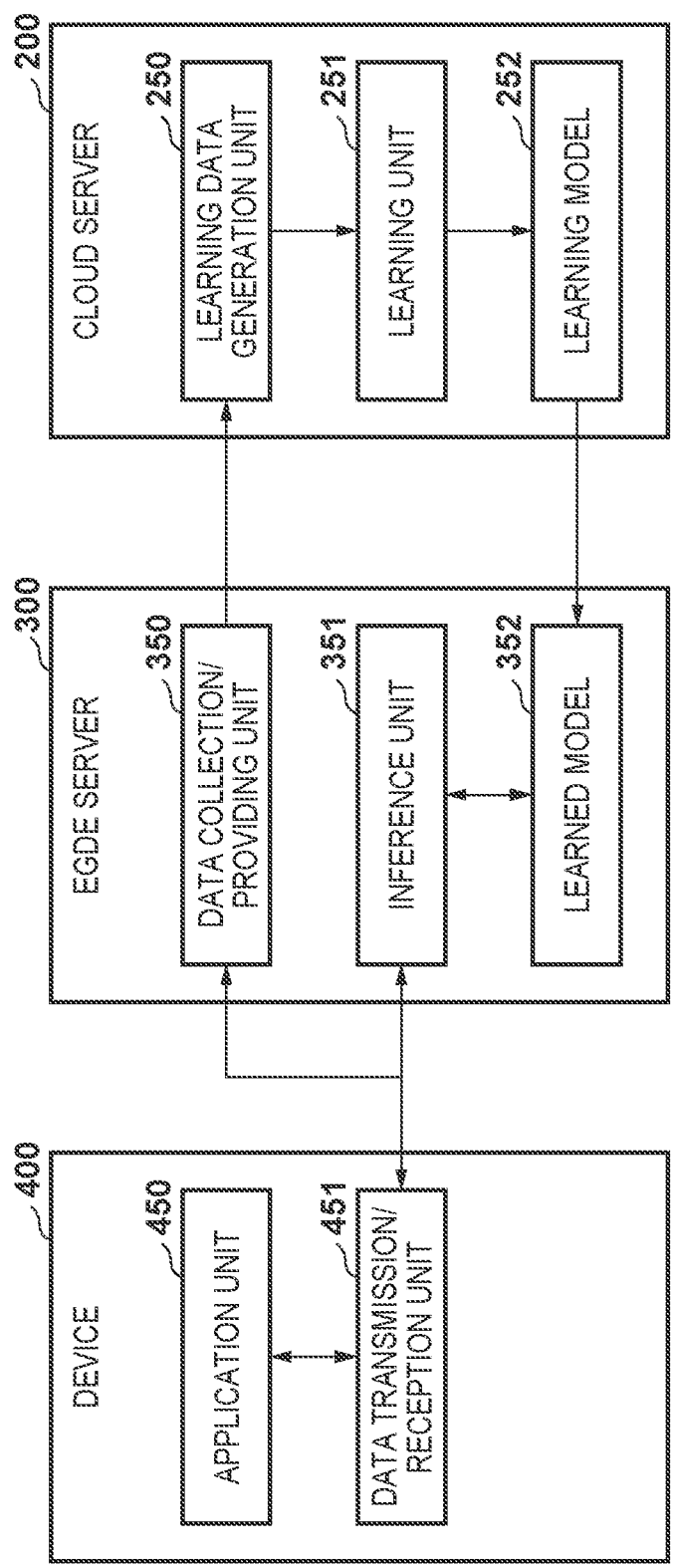

PRINT SYSTEM INCLUDING A LEARNED MODEL TO SELECT A PRINTER

BACKGROUND OF THE INVENTION

Field of the Invention

The present invention relates to a print system, a server, and a print method, and particularly to a print system, a server, and a print method where a plurality of printers are connected via a network.

Description of the Related Art

In recent years, there has be an increase in the use of so-called network print systems (hereinafter, simply systems) in which a plurality of printers are connected via a network, in relation to a single client terminal (PC or the like). In a case where such a system is in operation in an office, there are cases of connections by apparatuses that employ different methods such as printers of an electrophotographic method (LBP) and printers of an inkjet method (IJP) employed as the printers that are connected to the system.

When a PC user performs printing (outputting) by using a printer of the system, the printing is performed after having selected, as appropriate, the printer for performing the printing. Typically, when a print instruction for printing on a PC is inputted, a printer set as a "default printer" and the last printer to have been used are displayed on a PC screen. Accordingly, in the system, in a case where the user desires to print using a printer other than the printers that are displayed, it is necessary to change the printer name each time, and this is troublesome for the user.

To deal with this, in Japanese Patent Laid-Open No. 11-053142, a configuration is disclosed in which, in a case where a printer is selected from a plurality of printers connected to the network, attributes such as the color and size of document to be printed and printer functions sent from the printers are compared, and the printer that best suits those attributes is selected.

However, in the technique disclosed in Japanese Patent Laid-Open No. 11-053142, since the selection is based on printer functions decided in advance, there is a natural limit to the print attribute compatibility and there were cases where applicability is poor. Also, since taste differs depending on the user, there were cases where the printer selected by the user was different even when printing documents of the same print attributes, for example. In this fashion, according to conventional techniques, cases arose in which compatibility between the printer that a user wishes to use for printing and the printer that the system selected was not necessarily high.

SUMMARY OF THE INVENTION

Accordingly, the present invention is conceived as a response to the above-described disadvantages of the conventional art.

For example, a print system, a server, and a print method according to this invention are capable of more accurately selecting a printer that is in accordance with the intention of the user from a plurality of printer apparatuses connected to a network.

According to one aspect of the present invention, there is provided a printer system configured to connect a plurality of printers, a server, and a terminal to a network, wherein the terminal comprises: an input unit configured to input data necessary for printing via the network; a selection unit configured to select one printer from the plurality of printers via the network; and a display unit configured to display a printer to be used for performing printing, and the server comprises: a learned model that has learned to select one printer among the plurality of printers based on data that was used in previous printing inputted by the input unit of the terminal; and an inference unit configured to, based on data for new printing inputted by the input unit of the terminal, infer which printer is suited to the new printing from the plurality of printers by using the learned model.

According to another aspect of the present invention, there is provided a server in a printer system connected to a plurality of printers and a terminal via a network, the server comprising: a learned model that has learned to select one printer among the plurality of printers based on data that was used in previous printing by the plurality of printers inputted from the terminal; and an inference unit configured to, based on data for a new print inputted from the terminal, infer which printer is suited to the new printing from the plurality of printers by using the learned model.

According to still another aspect of the present invention, there is provided a print method in a printer system connecting a plurality of printers and a terminal via a network, the method comprising: inputting data for a new print from the terminal; based on the inputted data, using a learned model that has learned to select one printer among the plurality of printers based on data that was used in previous printing by the plurality of printers, to infer a printer suited to the new print from the plurality of printers; and conveying to the terminal the printer obtained as a result of the inference.

The invention is particularly advantageous since it can more accurately select a printer according to the objective of the user from the plurality of printers connected to the network.

Further features of the present invention will become apparent from the following description of exemplary embodiments (with reference to the attached drawings).

BRIEF DESCRIPTION OF THE DRAWINGS

FIG. 4 is a block diagram illustrating a software configuration related to a printer selection function to which AI technology is applied in the print system illustrated in FIG. 1.

DESCRIPTION OF THE EMBODIMENTS

Figure 1:
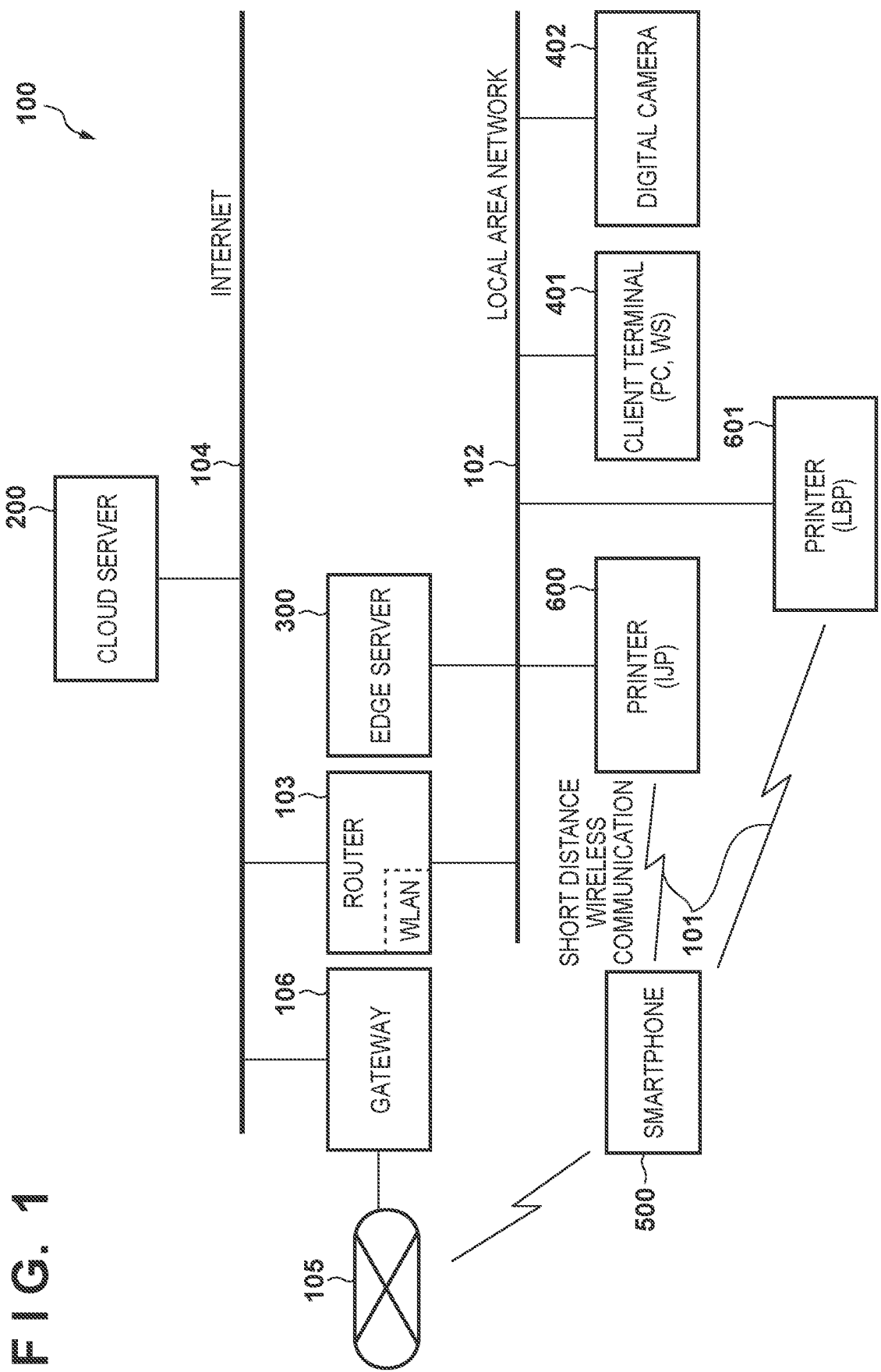
FIG. 1 is a block diagram illustrating an overview of a configuration of a print system which is an exemplary embodiment of the present invention.

Exemplary embodiments of the present invention will now be described in detail in accordance with the accompanying drawings. It should be noted that the following embodiments are not intended to limit the scope of the appended claims. A plurality of features are described in the embodiments. Not all the plurality of features are necessarily essential to the present invention, and the plurality of features may arbitrarily be combined. In addition, the same reference numerals denote the same or similar parts throughout the accompanying drawings, and a repetitive description will be omitted.

Overview of the Print System (FIG. 1)

FIG. 1 is a block diagram that illustrates an overview configuration of a print system that is an exemplary embodiment of the present invention.

As illustrated in FIG. 1, a print system (hereinafter simply system) 100 involves the Internet 104, a local area network (LAN) 102, and a public wireless network 105 known as LTE or 4G. Also, the system 100 is configured from a cloud server 200 connected to the Internet 104, an edge server 300 connected to a LAN 102, and a plurality of devices that are connected to the LAN 102. The LAN 102 and the Internet 104 are connected to each other via a router 103, and the Internet 104 is connected to a public wireless network 105 via a gateway 106.

The plurality of devices connected to the LAN 102 includes a client terminal 401 which is a personal computer (PC), a work station (WS), or the like, a digital camera 402, an ink-jet printer (IJP) 600, and a laser beam printer (LBP) 601. Furthermore, by short distance wireless communication 101 such as NFC, Bluetooth®, WiFi, or the like, a smartphone 500 that performs wireless communication of voice and data with the public wireless network 105 is connected to the IJP 600 and the LBP 601.

Accordingly, these devices are mutually connected via the LAN 102, and can connect with the Internet 104 via the router 103 from the LAN 102.

Note that in FIG. 1, the router 103 is illustrated as a device that connects the LAN 102 and the Internet 104, but it is possible to have a wireless LAN access point function that configures the LAN 102. In such a case, configuration may be taken so that the above-described devices connect to the LAN 102 by making a wireless LAN (WLAN) connection aside from connecting to the router 103 by wired LAN. For example, configuration may be such that the printer (IJP) 600, the printer (LBP) 601, and the client terminal 401 are connected by wired LAN, and the smartphone 500 is connected by the wireless LAN. Accordingly, it can be said that the smartphone 500 is a client terminal that can connect by wireless LAN (WLAN).

In any case, each device and the edge server 300 can mutually communicate with the cloud server 200 via the Internet 104 connected via the router 103. In this embodiment, the edge server 300 is provided with both a function as a print server to which a plurality of printers are connected and an inference unit that infers from a learned model (described later) that is a result of applying the AI technology. Meanwhile, the cloud server 200 comprises a function as a learning server that is provided with a learning unit to which AI technology was applied.

Also, each device and the edge server 300, and the respective devices with each other can mutually communicate via the LAN 102. Also, the smartphone 500 can connect to the Internet 104 via the public wireless cellular network 105 and the gateway 106 and communicate with the cloud server 200.

Note that the foregoing system configuration illustrates only one example, and a different configuration may be taken. For example, the router 103 comprises an access point (AP) function, and the AP may be configured by an apparatus other than the router 103. Also, the connection between the edge server 300 and each device may use a connection unit other than the LAN 102. For example, configuration may be taken such that rather than wireless LAN, wireless communication such as LPWA, ZigBee, Bluetooth®, NFC or the like, or a wired connection such as USB or infrared communication or the like is used.

Figure 2:
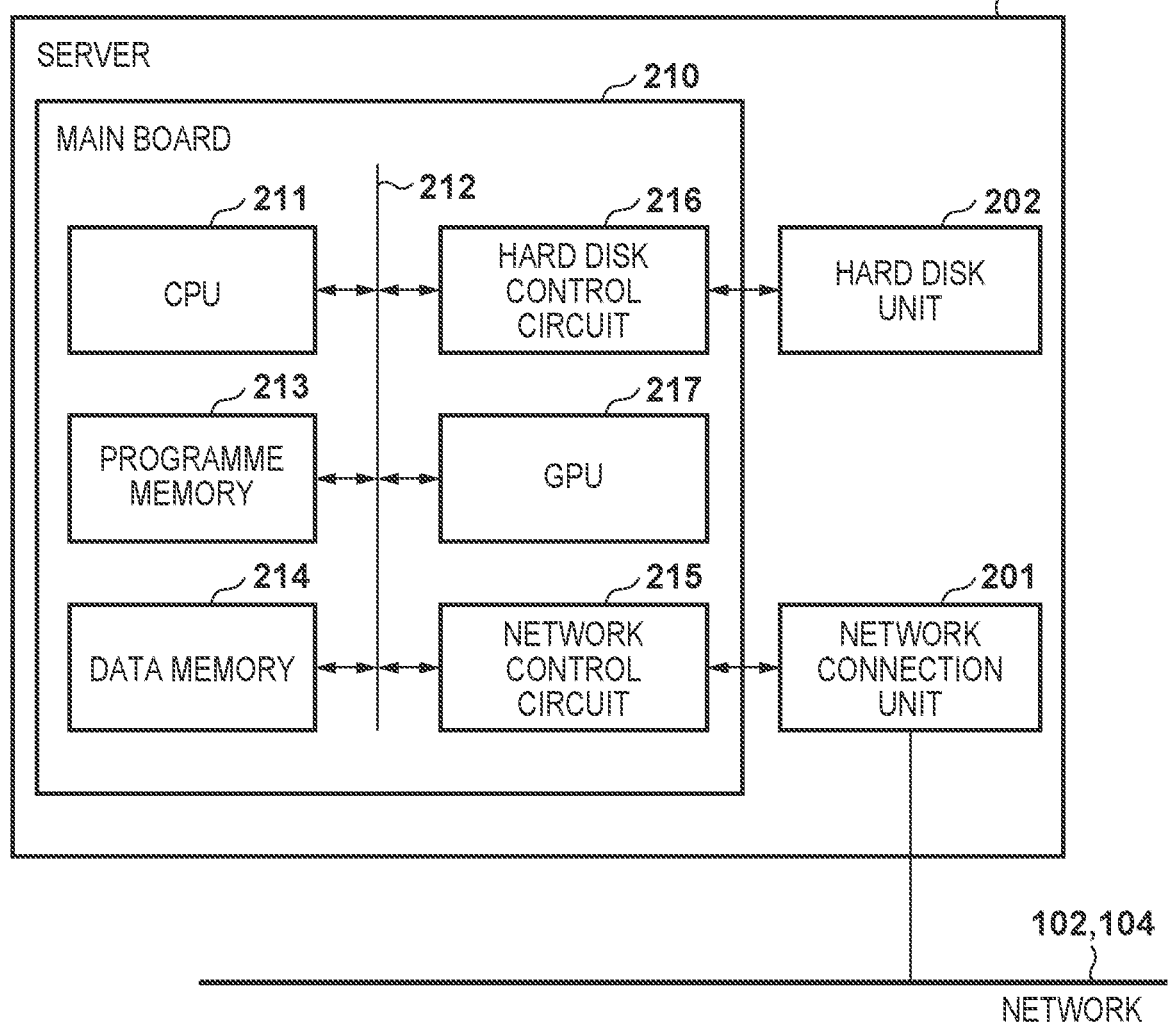
FIG. 2 is a block diagram illustrating a specific configuration of a cloud server and an edge server illustrated in FIG. 1.

Overview of Configuration of the Server (FIG. 2)

FIG. 2 is a block diagram illustrating a specific configuration of the cloud server and the edge server illustrated in FIG. 1. Here, the cloud server 200 and the edge server 300 are described as having the same hardware configuration. Hereinafter, the cloud server and the edge server will be referred to as simply server.

As illustrated in FIG. 2, the server 200, 300 comprises a main board 210 for controlling the apparatus as a whole, a network connection unit 201, and a hard disk unit 202.

A CPU 211 integrated into the main board 210 operates in accordance with a control program stored in a program memory 213 connected via an internal bus 212, and the content of a data memory 214. The CPU 211, by controlling the network connection unit 201 via a network control circuit 215, connects with a network such as the Internet 104 or the LAN 102, and performs communication with another apparatus. The CPU 211 can read/write data from/to a hard disk unit (HDU) 202 connected via a hard disk control circuit 216. The hard disk unit 202 stores an operating system (OS) and control software of the server 200, 300 that is loaded into the program memory 213 when used, and stores various kinds of data.

A GPU 217 is connected to the main board 210, and it is possible to cause various arithmetic operations to be executed thereby instead of by the CPU 211. The GPU 217 can perform efficient computation by a greater number of parallel processes of data, and so it is effective to perform processing by the GPU 217 in the case of performing learning multiple times using a learning model such as deep learning.

Accordingly, in this embodiment, it is assumed that the GPU 217 is used in addition to the CPU 211 for processing of the learning unit (described later). More specifically, in a case in which a learning program including a learning model is to be executed, the learning will be executed by causing the CPU 211 and the GPU 217 to perform computation cooperatively. Note that calculation for the processing of the learning unit may be performed solely by either the CPU 211 or the GPU 217. Also, the inference unit (described later) also may use the GPU 217 similarly to the learning unit.

Note that in this embodiment, the cloud server 200 is described as using a configuration that is the same as that of the edge server 300, but the configuration is not limited to this. For example, configuration may be such that the cloud server 200 is equipped with the GPU 217 but the edge server 300 is not, and GPUs 217 of different performance may be used respectively in each.

Figure 3:
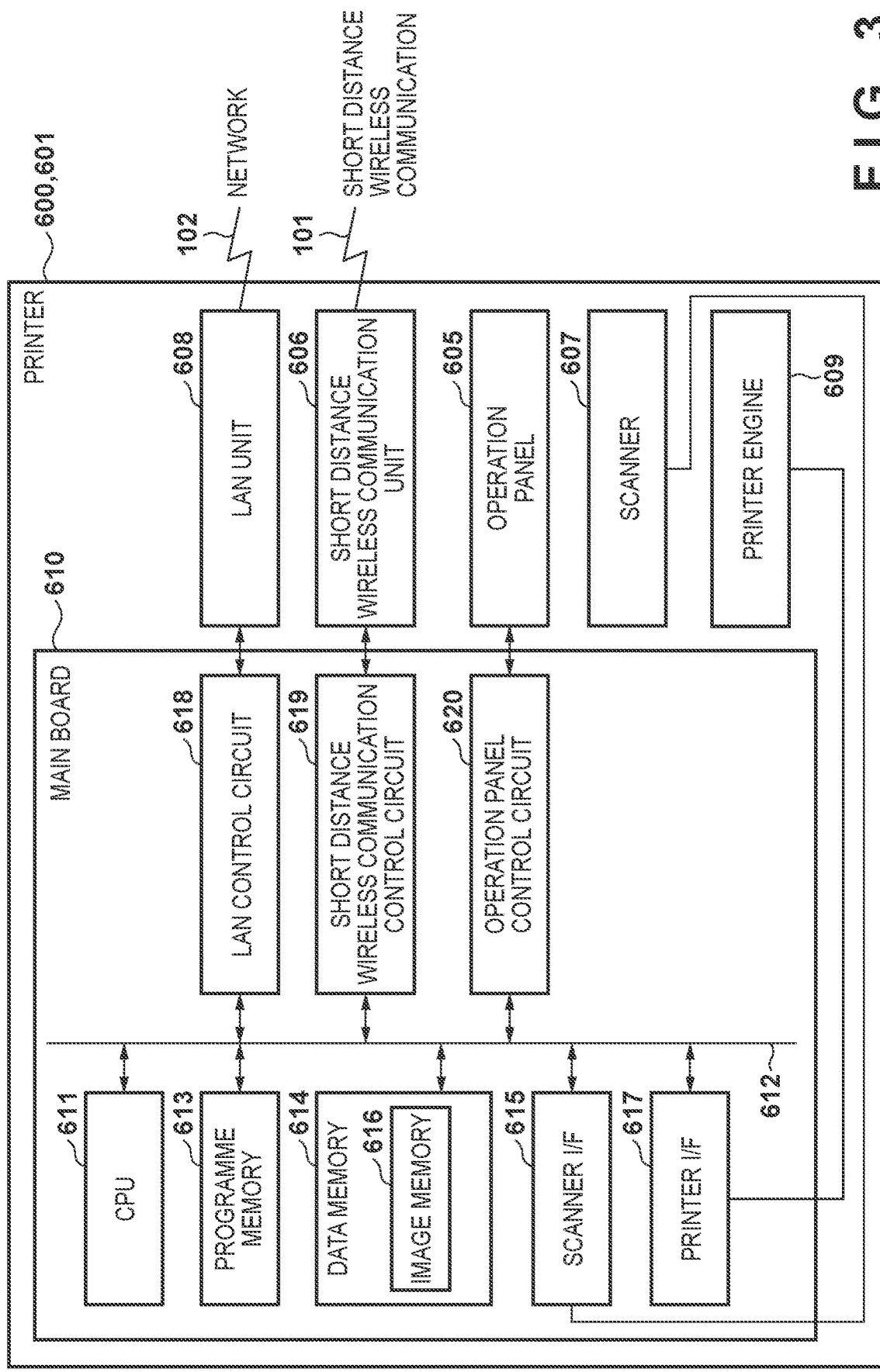
FIG. 3 is a block diagram illustrating a specific configuration of a printer (IJP) and a printer (LBP) illustrated in FIG. 1.

Overview of Configuration of the Printer (FIG. 3)

FIG. 3 is a block diagram for illustrating a specific configuration of the printer (IJP) and the printer (LBP) illustrated in FIG. 1.

As described above, the printer (IJP) 600 is an ink-jet printer. There are various inkjet printing methods, such as a thermal method and a piezo method, but in all methods, a print element such as an electrothermal transducer or an electromechanical transducer (piezoelectric element) or the like is driven to discharge an ink droplet onto a print medium from a nozzle provided in a printhead in order to print. Also, the printer (LBP) 601 is a laser beam printer that conforms to an electrophotographic method, and forms an electrostatic latent image by scanning a charged drum with a light beam, forming an image by developing the electrostatic latent image with toner, and printing by transferring the developed image onto the print medium.

As illustrated in FIG. 3, the printer (IJP) 600 and the printer (LBP) 601 have basically the same internal configuration. The printer 600, 601 comprises a main board 610 for performing control of the apparatus as a whole, a wireless LAN unit 608, a short-range wireless communication unit 606, a control panel 605, a scanner 607, and a printer engine 609. Here, the IJP 600 comprises a printer engine 609 that employs an inkjet method, and the LBP 601 comprises a printer engine 609 that employs an electrophotographic method.

A CPU 611 comprised in the main board 610 operates in accordance with a control program stored in a program memory (ROM) 613 connected via an internal bus 612, and the content of a data memory (RAM) 614. The CPU 611, via a scanner interface (I/F) 615, controls the scanner 607 and reads an image of a document, and stores image data of the image read into an image memory 616 of a data memory 614. Also, the CPU 611 can print an image onto a print medium by using image data of the image memory 616 of the data memory 614 by controlling a printer interface (I/F) 617.

The CPU 611, by controlling a LAN unit 608 through a LAN control circuit 618, performs communication with another terminal apparatus. Also, the CPU 611, by controlling the short-range wireless communication unit 606 via a short-range wireless communication control circuit 619, can detect a connection with another terminal, and perform transmission/reception of data with another terminal. Note that the LAN unit 608 may support a wired connection to the LAN 102, and may support a wireless connection to the LAN 102 via the wireless LAN access point function of the router 103.

Furthermore, the CPU 611, by controlling an operation panel control circuit 620, displays a state of the printer 600, 601 on the control panel 605 and displays a function selection menu, and can thereby receive operations from a user. A backlight is comprised in the control panel 605, and the CPU 611 can control lighting and extinguishing of a backlight via the operation panel control circuit 620. When the backlight is extinguished, display of the control panel 605 becomes difficult to see, but it is possible to suppress power consumption of the printer 600, 601 thereby.

Overview of Configuration of Software (FIG. 4)

FIG. 4 is a block diagram illustrating a software configuration related to a function for selecting a printer to which an AI technology was applied in the system illustrated in FIG. 1. In FIG. 4, only what relates to learning and inference processing in this embodiment is described in the software configuration, and other software modules are not illustrated. For example, an operating system, various middleware, applications for maintenance, and the like that operate on each device and on the server are not illustrated. Also, in FIG. 4, the client terminal 401, the digital camera 402, the IJP 600, and the LBP 601 mentioned in FIG. 1 and also the smartphone 500 are further collectively referred to as a device 400.

As illustrated in FIG. 4, the cloud server 200 comprises a learning data generation unit 250, a learning unit 251, and a learning model 252.

The learning data generation unit 250 is a module for generating learning data that the learning unit 251 can process from data received from an external unit. The learning data, as will be described later, is a pair of input data (X) of the learning unit 251 and teacher data (T) indicating a correct answer for a learning result. The learning unit 251 is a program module for executing learning of the learning data received from the learning data generation unit 250 with respect to the learning model 252. The learning model 252 accumulates results of learning performed by the learning unit 251.

Here, an example in which the learning model 252 is realized as a neural network will be described. It is possible to classify input data and decide an evaluation value by optimizing weighting parameters between the respective nodes of the neural network. The accumulated learning model 252 is delivered as a learned model to the edge server 300, and is used in inference processing in the edge server 300.

The edge server 300 comprises a data collection/providing unit 350, an inference unit 351, and a learned model 352.

The data collection/providing unit 350 is a module that transmits to the cloud server 200, as a data group to be used for learning, data received from the device 400 and data the edge server 300 itself collected. The inference unit 351 is a program module that executes inference by using the learned model 352 based on data sent from the device 400, and returns the result thereof to the device 400. The data transmitted from the device 400 is the data that becomes the input data (X) of the inference unit 351.

The learned model 352 is used for the inference performed by the edge server 300. Assume that the learned model 352 is implemented as a neural network in a manner similar to the learning model 252. However, as will be described later, the learned model 352 may be the same as the learning model 252 or may extract and use a part of the learning model 252. The learned model 352 stores the learning model 252 accumulated by and delivered from the cloud server 200. The learned model 352 may deliver the entire learning model 252 or may extract only a part necessary for the inference by the edge server 300 from the learning model 252 and deliver the extracted part.

The device 400 comprises an application unit 450 and a data transmission/reception unit 451.

The application unit 450 is a module that realizes various functions that are executed on the device 400, and is a module that uses a mechanism of learning/inference by machine learning. The data transmission/reception unit 451 is a module that makes a request for learning or inference to the edge server 300. During learning, data to be used for learning is transmitted to the data collection/providing unit 350 of the edge server 300 upon a request from the application unit 450. Also, during inference, data to be used for inference is transmitted to the inference unit 351 of the edge server 300 upon request from the application unit 450, the result thereof is received, and returned to the application unit 450.

Note that in the embodiment, a form in which the learning model 252 learned by the cloud server 200 is delivered as the learned model 352 to the edge server 300, and used for inference is illustrated, but the present invention is not limited by this. Which of the cloud server 200, the edge server 300, and the device 400 executes the learning and inference respectively may be determined in accordance with the distribution of the hardware resource, calculation amount and the data communication amount. Alternatively, configuration may be such that this is changed dynamically in accordance with the distribution of the hardware resource, and increase/decrease of calculation amount and data communication amount. In a case where the performer of the learning and the inference differs, it is possible to configure to be able to perform execution at higher speed by reducing to only the logic used for inference and reducing the space of the learned model 352 on the inference side.

Figure 5A:
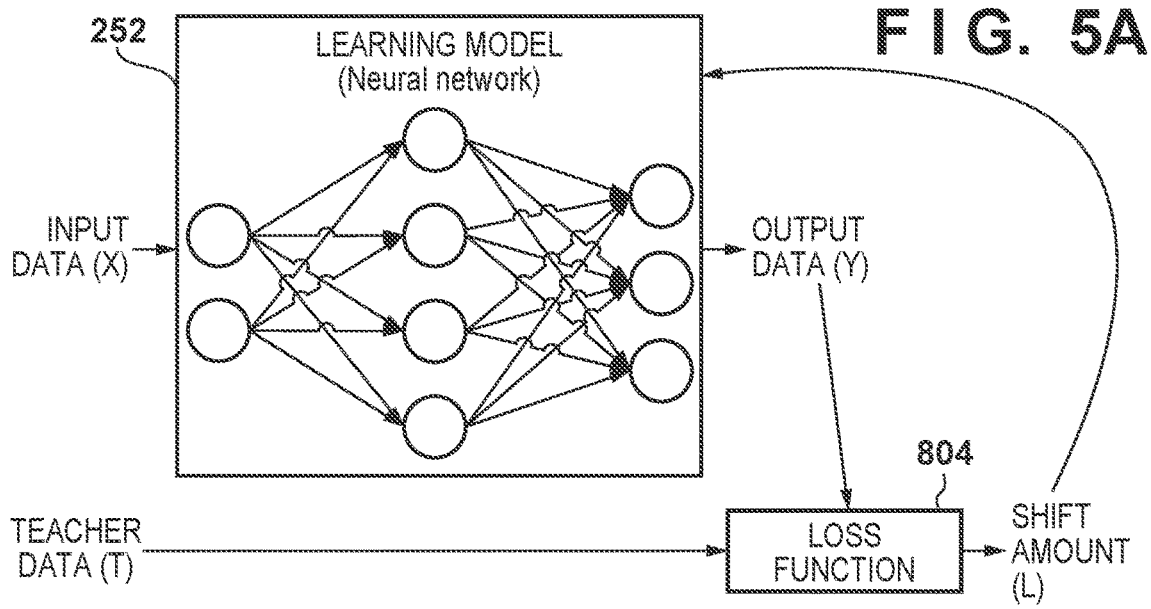
FIGS. 5A and 5B are schematic diagrams illustrating an input/output structure for when the learning model and the learned model as illustrated in FIG. 4 are used.
Figure 5B:
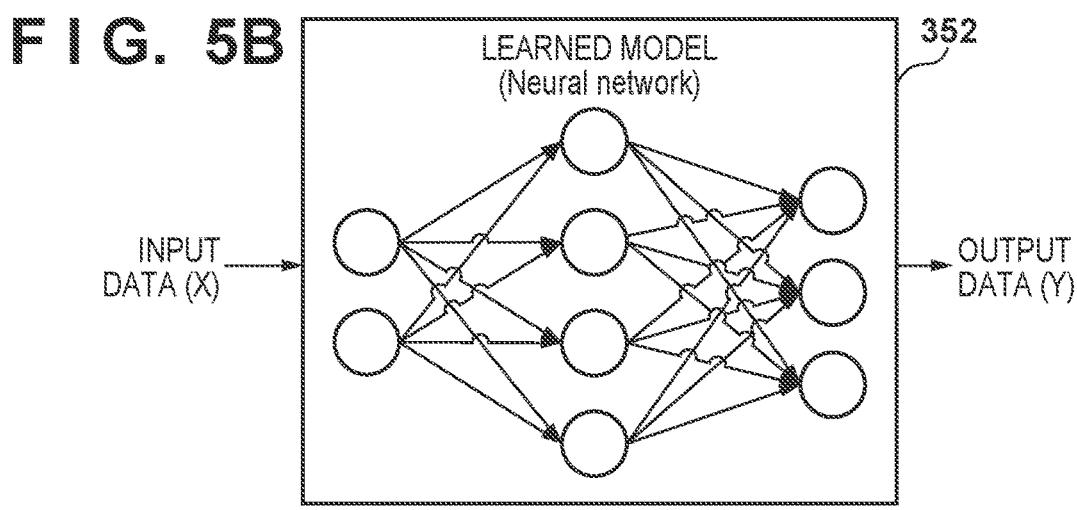

Description of the Learning Model (FIGS. 5A and 5B)

FIGS. 5A and 5B are schematic diagrams illustrating an input/output structure for when using the learning model and the learned model illustrated in FIG. 4. FIG. 5A illustrates a state of the learning model 252 and data input/output thereof in a case of causing the learning model to learn, and FIG. 5B illustrates a relationship between the learned model 352 in the case where inference is performed using the learned model, and the input/output data thereof The input data (X) at the time of learning illustrated in FIG. 5A is data of the input layer of the learning model 252. Note that the details of the input data (X) are described later. During learning, as the result of recognition of the input data (X) using the learning model 252 which is a machine-learning model, output data (Y) is outputted. During learning, the teacher data (T) is given as correct answer data for the recognition result of the input data (X), and therefore by applying output data (Y) and the teacher data (T) to a loss function 804, a deviation amount (L) which is an error from the correct answer of the recognition result is obtained. So that the deviation amount (L) in relation to a large amount of learning data becomes smaller, combine-weighting coefficients between the nodes of the neural network of the learning model 252 or the like are updated. In an error backpropagation method, combine-weighting coefficients or the like between nodes of the neural network respectively are adjusted so that the above-described error becomes smaller.

Specific algorithms for machine learning include a nearest neighbor method, a naive Bayes method, a decision tree, and a support vector machine. Also, there is deep learning in which, by using a neural network, a feature amount for learning and combine-weighting coefficients are self-generated. As necessary, any of the above-mentioned algorithms may be used in application to a learning model in this embodiment.

The input data (X) at the time of inference illustrated in FIG. 5B is data of the input layer of the learned model 352. During inference, as the result of recognition of the input data (X) using the learned model 352 which is a machine-learning model, output data (Y) is outputted. During inference, output data (Y) is used as an inference result. Note that the learned model 352 during inference is described as comprising a neural network similar to the learning model 252 during learning, but the learned model 352 may comprise only parts necessary in inference. By this, it is possible to reduce the data amount that the learned model 352 handles, and shorten the neural network processing time during inference.

Next, features regarding learning and inference resulting from applying the learning model described with reference to FIGS. 5A and 5B to optimal printer selection in this embodiment will be described.

Feature of Learning and Inference

In this embodiment, as described in FIG. 1, at least two printers 600 and 601 are connected to the print system, and it is possible for the user to perform printing by selecting their preferred printer as appropriate from the client terminal 401. As an example, in this embodiment, two types of printers illustrated in Table 1 are used.

The printer (IJP) 600 comprises an inkjet printhead of a page-wide type supporting the A3 size whose length corresponds to the width of the print medium, and performs full-color printing by discharging four colors of ink (yellow, magenta, cyan, and black) from the printhead. Note that the printing speed thereof is 60 ipm. Meanwhile, the printer (LBP) 601 can perform monochromatic printing, in which only black toner is used up to a print medium of the A4 size. Note that the printing speed thereof is 30 ipm.

TABLE 1

| Type | Printing method | Printing speed | Maximum print size | Printing color |
|------|-----------------|----------------|--------------------|----------------|
| IJP | inkjet | 60ipm | A3 | color |
| LBP | electrophotography | 30ipm | A4 | monochrome |

Note that in the example illustrated in FIG. 1 and Table 1, there are two types of the network printer connected to the LAN, but the present invention is not limited by this. For example, there is no need that there be only one type of ink-jet printer (IJP). For example, the printer (IJP) in Table 1 is something that uses four colors of ink (yellow (Y), magenta (M), cyan (C), and black (K)), but a printer that uses more inks such as 8 colors, 10 colors, 12 colors and the like, in order to print images at a higher quality may also be used. Furthermore, while there are two types of printing method for the printers in Table 1, printers that follow other printing methods, for example, a sublimation method printer or the like, may be used.

In such an embodiment, the learned model 352 is generated by the user ultimately making the selection by the client terminal 401 at the time of each print, and performing learning by the learning unit 251 using the printer type (selection instruction) as the teacher data (T) when printing is executed. When performing a new print, a user performs a print instruction based on the input data (X) and the learned model 352 described later, and the predicted printer type is inferred by the inference unit 351.

Hereinafter, this process will be described in detail.

Learning Phase

The input data (X) in this embodiment is:
(1) a character portion/image portion in a page to be printed;
(2) a number of pages that are the print target;
(3) an output size that is the print target;
(4) software (an application) used to generate the print target; and
(5) the printer used most recently.
At least one of the input data (1) to (5) is inputted to the learning model 252 or the learned model 352.

In the input data (X), from the perspective of (1) the character portion/image portion in the page of the print target, a monochrome printer 601 will typically be selected when the character portion is relatively large, and conversely the printer 600 will be selected more often when the image portion of is large. For the input data (X), from the perspective of (2) the number of pages to be printed, it is more often the case that the printer 600 which can print at a relatively high speed is selected when the number of pages is comparatively large. For the input data (X), from the perspective of (3) the output size of the print target, the printer 600 is more often selected when the page size of an application used on a PC is A3 or greater. For the input data (X), from the perspective of (4) software to be used to generate the print target, the printer 600 which is suitable to color printing is more often selected for printing from drawing software or photograph applications. For the input data (X), from the perspective of (5) the printer used most recently, since it is often the case that one of the printers that is more preferred by a user of the PC is used as a main printer, the printer used most recently is referenced as input data.

In this fashion, in this embodiment, learning is performed by the learning unit 251 of the cloud server 200 via the data collection/providing unit 350 of the edge server 300 using data such as the above-described (1) to (5) as the input data (X). The learning unit 251 performs learning based on the input data (X), the teacher data (T), and the printer type that the user actually selected. In this fashion, data learned by the learning unit 251 is accumulated in the learning model 252 in the cloud server 200.

Data learned by performing learning based on the input data of multiple times from multiple users via the edge server 300 and the cloud server 200 is accumulated in the learning model 252. In this fashion, through print of the previous several times, the learning unit 251 learns which printer is suited to a user request.

Inference Phase

The learned data obtained by the learning unit 251 of the cloud server 200 and accumulated in the learning model 252 is accumulated in the edge server 300 as the learned model 352. Here, in the case where a new print instruction from a user is sent from the device 400, inference is executed by the inference unit 351 of the edge server 300 based on the input data (1) to (5) and the learned model 352, and an inference result obtained thereby is delivered to the device 400.

Assume that at that time, the inference result in the inference unit 351 is that the printer 600 is selected, for example. In such a case, a screen 10 used for a print instruction on a monitor of the PC in the case where the print instruction is executed on the PC by the user is displayed.

Figure 6:
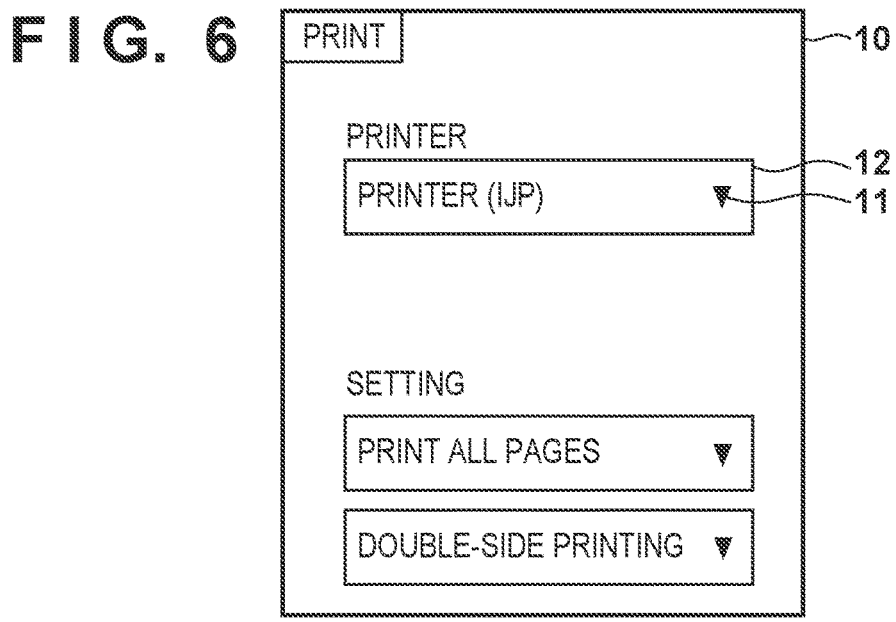
FIG. 6 is a view illustrating a display screen of a monitor of a personal computer (PC).

FIG. 6 is a view illustrating a display screen of a monitor of the personal computer (PC).

In FIG. 6, an example in which the screen 10 for print instructions is displayed is illustrated. The printer name selected in a printer selection part 12 is displayed in the screen 10. In the case where the printer type is to be changed, a plurality of types of printers that can be used are displayed by clicking a pull-down button 11, and the user selects the desired printer from among these. In this embodiment, because the printer 600 was selected in the inference unit 351, the printer (IJP) is displayed on the printer selection part 12. A screen similar to what is illustrated in FIG. 6 can be displayed on another client terminal such as the smartphone 500 or a work station (WS) or the like.

Accordingly, in accordance with the embodiment described above, the printer resulting from the inference by the inference unit of the edge server is displayed whenever a print instruction is made on the display screen of the personal computer. Here, the type of printer that the user ultimately performed the printing with is used for learning as the teacher data (T). In this fashion, using AI technology, it becomes possible to accurately display on the display screen the type of printer that user is likely to output with by repeatedly performing learning/inference. Hypothetically, even if the user sets a specific printer as a "default printer" on the PC, it is possible to display the printer that the user desires to use by displaying the type of printer prioritizing the result according to the above-described inference unit. The result of this is that is becomes possible to reduce the effort in changing the printer to be used by the user operating a pull-down button or the like.

Note that one edge server is connected for one cloud server in the above described embodiment, and the learning unit in the cloud server performs learning based on a plurality of input data from the edge server. However, the present invention is not limited by this. For example, rather than connecting a plurality of edge servers to one cloud server, and referencing input data from all of the edge servers when learning, configuration may also be taken such that learning is performed based on input data of a specific one or more edge servers, and inference is performed by the inference unit of the edge server.

Figure 7:
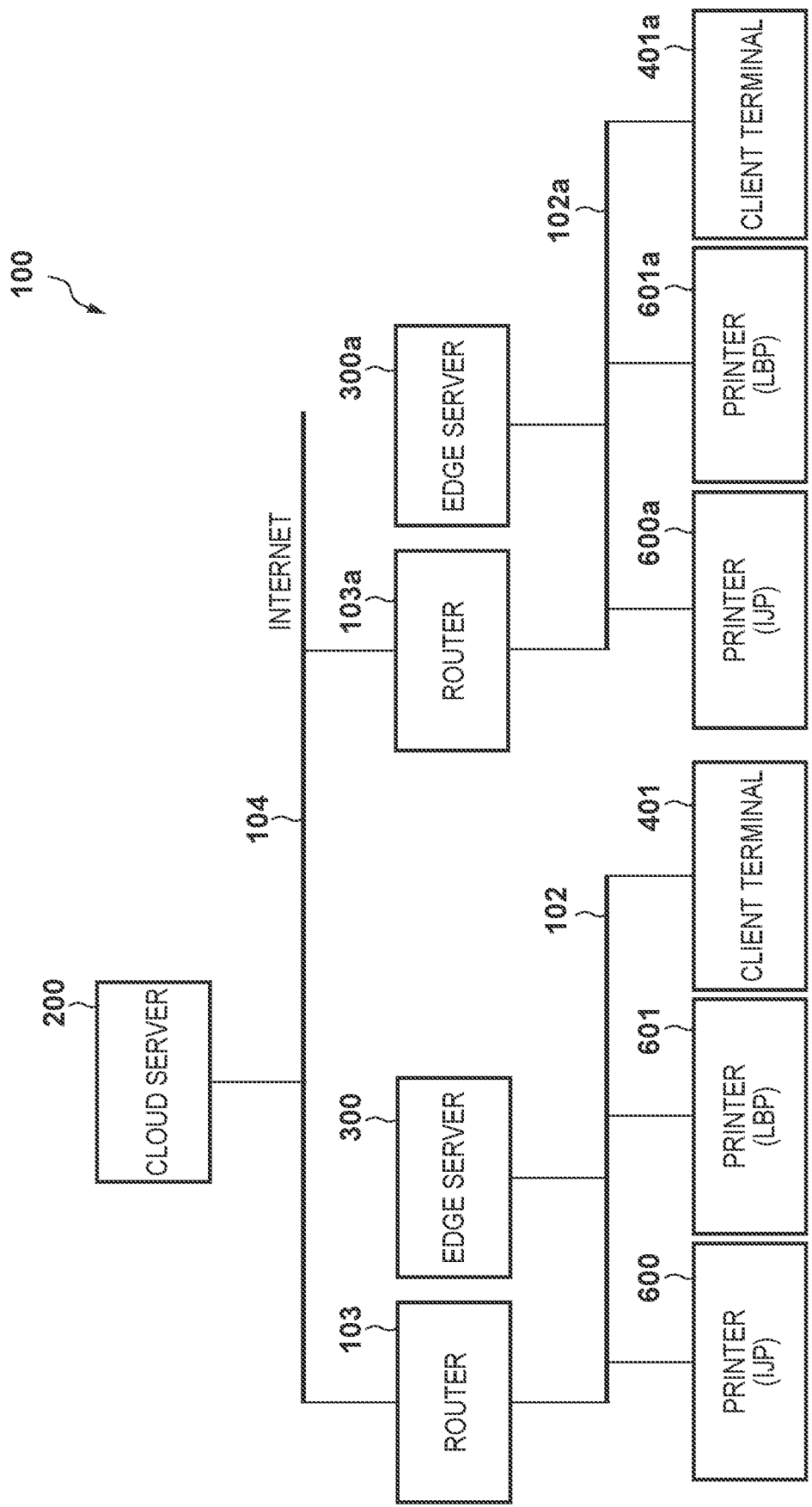
FIG. 7 is a block diagram illustrating an overview configuration of a print system according to another embodiment of the present invention.

FIG. 7 is a block diagram that illustrates an overview configuration of a print system according to another embodiment of the present invention. In FIG. 7, the same reference numerals are given to elements that are the same as in previously described FIG. 1, and description thereof is omitted. As can be seen from a comparison of FIG. 7 and FIG. 1, in this example, two configurations are provided for connecting one edge server via the Internet 104 and one router to one cloud server 200. Also, via the LAN 102, 102a, a plurality of devices are respectively connected to the edge server 300, 300a.

By FIG. 7, the edge server 300 is connected via the router 103 to the cloud server 200 similarly to FIG. 1, and a plurality of printers 600, 601 and the client terminal 401 are connected to the edge server 300. This is assumed to be a network printer environment in company A. Also, an edge server 300a is connected via a router 103a as a network printer environment of company B, and the plurality of printers 600a, 601a and a client terminal 401a are connected thereto.

Here, for example, assume that to reduce expenses (cost) at company A, employees have been told to use the printer 601 which is the monochrome printer as much as possible. In the case where the employees of company A perform printing, for example, even for cases where a target object with a comparatively large image portion is printed, it is often the case that rather than the printer 600 which is a color printer, the printer 601 is used. Accordingly, in a typical learning model 252 described in the above-described embodiment, there are cases that are not suited to the characteristics of the company A. In this fashion, there are cases where the characteristics (tendencies) of the learning model, for each company differ for each sub-system connected to the edge server, in other words.

Accordingly, in the printer system illustrated in FIG. 7, the learning model is made to be different for each of a plurality of edge servers connected to the cloud server 200, and inference is performed for each different learning model.

In other words, individual learning and inference are performed for each company (for each edge server).

In this fashion, in the printer system illustrated in FIG. 7, an inference unit is comprised for each of the edge servers 300 and 300a. Thus, for example, in a case of performing inference by the inference unit of the edge server 300a, learned data that was collected only from the client terminal 401a connected to the edge server 300a (the router 103a) is used. In other words, inference is performed without using learned data collected from the client terminal 401 connected to the edge server 300 (the router 103).

Also, in the embodiment described above, there was a configuration comprising a learning unit in the cloud server, but configuration may be taken to comprise a learning unit in each edge server in a system as illustrated in FIG. 7. For example, learning is performed by a learning unit of the edge server 300a in relation to input data from the client terminal 401a connected to the router 103a, and learning is performed by the learning unit of the edge server 300 in relation to input data from the client terminal 401 connected to the router 103.

By configuring the system in this fashion, it is possible to perform learning using a dedicated learning model in relation to input data collected individually for each different network printer environment, and to perform inference by feedback to the inference unit of learned data obtained by that learning. Accordingly, it is possible to perform a printer selection suited to each different network printer environment.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The processor or circuit, may comprise a CPU, an MPU, a graphics processing unit (GPU), an ASIC (Application Specific Integrated Circuit), an FPGA (Field Programmable Gateway), or the like. The processor or the circuit can also include a digital signal processor (DSP), a data flow processor (DFP), or a neural processing unit (NPU).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-209832, filed Nov. 20, 2019, which is hereby incorporated by reference herein in its entirety.

What is claimed is:

1. A printer system configured to connect a plurality of printers, a server, and a terminal to a network, wherein
the terminal comprising a first memory containing instructions and at least one first processor to execute the instructions to operate as:
an input unit configured to input data necessary for printing via the network;
a selection unit configured to select one printer from the plurality of printers via the network; and
a display to display a printer to be used for performing printing, and
the server comprising a second memory containing instructions and at least one second processor to execute the instructions to operate as:
a learned model that has learned to select one printer among the plurality of printers based on data that was used in previous printing inputted by the input unit of the terminal; and
an inference unit configured to, based on data for new printing inputted by the input unit of the terminal, infer which printer is suited to the new printing from the plurality of printers by using the learned model.

2. The system according to claim 1, wherein
the server further executes instructions to operate as:
a learning unit configured to machine-learn which printer should be selected, based on the data inputted by the input unit of the terminal and a printer selected by the selection unit of the terminal;
a learning model generated based on learned data obtained by the learning unit; and
a deliver unit configured to deliver data needed for selecting at least a printer to the learned model from the learning model.

3. The system according to claim 2, wherein
the plurality of printers include a printer according to an inkjet method, a printer according to an electrophotographic method, a printer according to a sublimation method, and printers according to an inkjet method that use different numbers of inks.

4. The system according to claim 2, wherein
the network includes an Internet and a local area network, and
the server includes:
a cloud server connected to the Internet; and
an edge server connected to the local area network.

5. The system according to claim 4, further comprising a router in which the Internet and the local area network are connected, wherein
the router has a function of performing wireless communication according to WLAN.

6. The system according to claim 5, wherein
the terminal includes a personal computer and a work station wire-connected to the local area network and a smartphone wireless-connected by the WLAN.

7. The system according to claim 4, wherein
the cloud server includes the learning unit and the learning model, and the edge server includes the learned model and the inference unit.

8. The system according to claim 7, wherein
there is one cloud server,
there are a plurality of edge servers, and
each of the plurality of the edge servers includes the learned model and the inference unit.

9. The system according to claim 1, wherein
the display of the terminal displays a printer obtained as a result of inference by the inference unit of the server.

10. The system according to claim 1, wherein
data inputted from the input unit of the terminal includes at least one of a character portion/image portion in a page to be printed, a number of pages of a print target, an output size of a print target, and software used to generate a print target, and a printer used most recently.

11. A server in a printer system connected to a plurality of printers and a terminal via a network, the server comprising a memory containing instructions and at least one processor executing the instructions to operate as:
a learned model that has learned to select one printer among the plurality of printers based on data that was used in previous printing by the plurality of printers inputted from the terminal; and
an inference unit configured to, based on data for a new print inputted from the terminal, infer which printer is suited to the new printing from the plurality of printers by using the learned model.

12. The server according to claim 11, wherein the memory further includes instructions to be executed to operate as:
a learning unit configured to machine-learn which printer should be selected, based on data inputted by the terminal and a printer selected by the terminal;
a learning model generated based on learned data obtained by the learning unit; and
a deliver unit configured to deliver data needed for selecting at least a printer to the learned model from the learning model.

13. The server according to claim 12, wherein
the network includes an Internet and a local area network, and
the server includes:
a cloud server connected to the Internet; and
an edge server connected to the local area network.

14. The server according to claim 13, wherein
the cloud server includes the learning unit and the learning model, and
the edge server includes the learned model and the inference unit.

15. The server according to claim 14, wherein
there is one cloud server,
there are a plurality of edge servers, and
each of the plurality of the edge servers include the learned model and the inference unit.

16. A print method in a printer system connecting a plurality of printers and a terminal via a network, the method comprising:
inputting data for a new print from the terminal;
based on the inputted data, using a learned model that has learned to select one printer among the plurality of printers based on data that was used in previous printing by the plurality of printers, to infer a printer suited to the new print from the plurality of printers; and
conveying to the terminal the printer obtained as a result of the inference.

17. The method according to claim 16, further comprising:
machine-learning which printer should be selected, based on data inputted by the terminal and a printer selected by the terminal;
generating a learning model based on learned data obtained by the machine learning; and
delivering data needed for selecting at least a printer to the learned model from the learning model.

18. The method according to claim 16, comprising displaying on a display of the terminal a printer obtained as a result of the inference.

\* \* \* \* \*